(12) United States Patent
Horiuchi et al.

(10) Patent No.: US 10,987,742 B2
(45) Date of Patent: Apr. 27, 2021

(54) METHOD OF CONTROLLING POSITIONING CONTROL APPARATUS AND POSITIONING CONTROL APPARATUS

(71) Applicant: KAWASAKI JUKOGYO KABUSHIKI KAISHA, Hyogo (JP)

(72) Inventors: Yuhei Horiuchi, Nishinomiya (JP); Daisuke Kawakami, Kobe (JP); Kazunori Hara, Kakogawa (JP); Jun Fujimori, Himeji (JP); Hajime Kashiki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 76 days.

(21) Appl. No.: 16/329,713

(22) PCT Filed: Aug. 30, 2017

(86) PCT No.: PCT/JP2017/031155
§ 371 (c)(1),
(2) Date: Feb. 28, 2019

(87) PCT Pub. No.: WO2018/043563
PCT Pub. Date: Mar. 8, 2018

(65) Prior Publication Data
US 2019/0193167 A1 Jun. 27, 2019

(30) Foreign Application Priority Data

Aug. 30, 2016 (JP) .............................. JP2016-167612

(51) Int. Cl.
*B23B 39/08* (2006.01)
*G05B 19/404* (2006.01)
(Continued)

(52) U.S. Cl.
CPC .............. *B23B 39/08* (2013.01); *B23B 35/00* (2013.01); *B23K 20/12* (2013.01); *B25J 9/10* (2013.01);
(Continued)

(58) Field of Classification Search
CPC ......... B23B 35/00; B23B 39/08; B23K 20/12; B23K 20/123; B25J 11/005; B25J 13/00;
(Continued)

(56) References Cited

U.S. PATENT DOCUMENTS

2008/0297092 A1* 12/2008 Nihei ..................... B25J 9/1633
318/568.22
2011/0041982 A1* 2/2011 Fleming ............... B23K 20/123
156/64
(Continued)

FOREIGN PATENT DOCUMENTS

JP   S58-206394 A   12/1983
JP   S63-155302 A    6/1988
(Continued)

OTHER PUBLICATIONS

Guillo et al., "Impact & improvement of tool deviation in friction stir welding: Weld quality & real-time compensation on an industrial robot," Robotics and Computer-Integrated Manufacturing, 2016, vol. 39, pp. 22-31.
(Continued)

*Primary Examiner* — Yuhui R Pan
(74) *Attorney, Agent, or Firm* — Oliff PLC

(57) ABSTRACT

A method of controlling a positioning control apparatus includes the steps of: deriving a predetermined relational expression in advance; detecting the pressing force during machining by a force sensor; calculating the sideslip amount corresponding to the pressing force detected by the force sensor, in accordance with the predetermined relational (Continued)

expression at any time; correcting a position command value of an arm tip of the positioning control apparatus based on the calculated sideslip amount; and machining the workpiece while moving the arm tip of the positioning control apparatus in accordance with the corrected position command value.

9 Claims, 10 Drawing Sheets

(51) Int. Cl.
*B25J 13/00* (2006.01)
*B25J 13/08* (2006.01)
*B25J 9/10* (2006.01)
*B23K 20/12* (2006.01)
*B23B 35/00* (2006.01)

(52) U.S. Cl.
CPC ............... *B25J 13/00* (2013.01); *B25J 13/08* (2013.01); *G05B 19/404* (2013.01); *G05B 2219/35017* (2013.01); *G05B 2219/35261* (2013.01); *G05B 2219/39177* (2013.01)

(58) Field of Classification Search
CPC ........ B25J 13/08; B25J 13/085; B25J 13/089; B25J 18/002; B25J 9/10; B25J 9/1633; G05B 19/404; G05B 2219/35017; G05B 2219/35261; G05B 2219/39177
See application file for complete search history.

(56) References Cited

U.S. PATENT DOCUMENTS

| 2015/0088468 A1* | 3/2015 | Hohl | ....................... E21B 41/00 703/2 |
|---|---|---|---|
| 2016/0039092 A1 | 2/2016 | Harada et al. | |

FOREIGN PATENT DOCUMENTS

| JP | H04-046782 A | 2/1992 |
|---|---|---|
| JP | H11-221707 A | 8/1999 |
| JP | 2004-136316 A | 5/2004 |
| JP | 2008-296310 A | 12/2008 |
| JP | 2016-036858 A | 3/2016 |
| JP | 2016-117085 A | 6/2016 |

OTHER PUBLICATIONS

Belchior et al., "Off-line compensation of the tool path deviations on robotic machining: Application to incremental sheet forming," Robotics and Computer-Integrated Manufacturing, 2013, vol. 29, pp. 58-69.

* cited by examiner

METHOD OF CONTROLLING POSITIONING CONTROL APPARATUS AND POSITIONING CONTROL APPARATUS

TECHNICAL FIELD

The present invention relates to a method of controlling a positioning control apparatus and the positioning control apparatus.

BACKGROUND ART

Typically, when performing machining (for example, drilling) which requires highly accurate positioning and generates machining reaction force, a positional displacement of a tip end of a machining tool is caused by the machining reaction force, and this deteriorates the accuracy of a machining position. As a result, a machining target (hereinafter referred to as a "workpiece") is damaged. In order to prevent this phenomenon, the machining tool attached to a tip end of a positioning control apparatus is pressed before the machining against the workpiece by force (hereinafter may be referred to as "pressing force") that is equal to or more than the machining reaction force. At this time, deflection of the positioning control apparatus is caused by reaction force of the pressing force. As a result, the positional displacement of the tip end of the machining tool occurs. The occurrence of the positional displacement influences the accuracy of the machining position.

In order to correct the deflection of the positioning control apparatus, there is a conventional method of using a rigidity value of the positioning control apparatus and calculating a deflection amount of the positioning control apparatus from force acting on the positioning control apparatus (see PTL 1, for example).

Further, as conventional art, there is a method in which: a force sensor is attached to a tip end of an arm of a robot; force acting on a member held by the robot and deflection by this force are calculated by the force sensor; and with this, the position of the member held by the robot is corrected (see PTL 2, for example). Furthermore, there is a method in which at the time of machining of a drilling robot, a feed device attached to an arm tip end portion together with a tool is fixed to a support base for a workpiece (see PTL 3, for example).

CITATION LIST

Patent Literature

PTL 1: Japanese Laid-Open Patent Application Publication No. 2008-296310
PTL 2: Japanese Laid-Open Patent Application Publication No. 58-206394
PTL 3: Japanese Laid-Open Patent Application Publication No. 11-221707

SUMMARY OF INVENTION

Technical Problem

However, according to the method of PTL 1, if the accurate rigidity value is unknown, the deflection amount cannot be calculated accurately. The rigidity of the positioning control apparatus differs depending on types and individual differences. Therefore, the rigidity value used for the calculation needs to be changed depending on the type of the positioning control apparatus.

The present invention was made to solve the above problems, and an object of the present invention is to perform machining while preventing a positional displacement during the machining without calculating a deflection amount by using a rigidity value of a positioning control apparatus.

Solution to Problem

To solve the above problems, a method of controlling a positioning control apparatus according to one aspect of the present invention is a method of controlling a positioning control apparatus configured to perform machining while pressing a tip end of a machining tool against a predetermined position on a machined surface of a workpiece, the machining tool being attached to an arm tip of the positioning control apparatus, the method including the steps of: deriving a predetermined relational expression before the machining, the relational expression defining a relation of a sideslip amount of the tip end of the machining tool in a second direction with pressing force generated when the tip end of the machining tool is pressed against the predetermined position in a first direction in a state where the tip end of the machining tool coincides with the predetermined position, the second direction being parallel to the machined surface of the workpiece, the first direction being perpendicular to the machined surface of the workpiece; detecting the pressing force during the machining by a force sensor; calculating the sideslip amount corresponding to the pressing force detected by the force sensor, in accordance with the predetermined relational expression at any time; correcting a position command value of the arm tip of the positioning control apparatus based on the calculated sideslip amount; and machining the workpiece while moving the arm tip of the positioning control apparatus in accordance with the corrected position command value.

According to the above method, the sideslip amount corresponding to the pressing force during the machining can be calculated in accordance with the predetermined relational expression derived in advance. With this, the machining can be performed without being influenced by force (tool generating force) generated by the machining tool and acting in a direction parallel to a flat surface of the workpiece while preventing the occurrence of the positional displacement of the tip end of the machining tool.

The step of deriving the predetermined relational expression before the machining may include the steps of: setting a mathematical model by using a plurality of finite elements, the mathematical model being prepared by modeling deflection of the positioning control apparatus; calculating the sideslip amount with respect to maximum pressing force by finite element method analysis, the maximum pressing force being set to force that is equal to or more than machining reaction force; and deriving the predetermined relational expression by substituting the calculated sideslip amount with respect to the maximum pressing force in the mathematical model.

According to the above configuration, the relational expression defining the relation of the sideslip amount with the pressing force can be derived in advance before the machining. With this, as compared to a method in which the sideslip amount with respect to the pressing force is successively calculated in accordance with the posture of the positioning control apparatus, highly accurate machining can be realized while significantly reducing the calculation amount during the machining.

The step of deriving the predetermined relational expression before the machining may include the steps of: controlling the positioning control apparatus such that the tip end of the machining tool is pressed against the machined surface in a state where a position of the tip end of the machining tool coincides with the predetermined position on the machined surface; detecting first-direction force and second-direction force by the force sensor, the first-direction force acting in the first direction perpendicular to the machined surface of the workpiece and being a part of force received by the tip end of the machining tool from the machined surface of the workpiece, the second-direction force acting in the second direction parallel to the machined surface of the workpiece and being a part of the force received by the tip end of the machining tool from the machined surface of the workpiece; correcting a position of the machining tool such that the second-direction force generated until the first-direction force detected by the force sensor reaches maximum pressing force becomes a predetermined value or less, the maximum pressing force being set to force that is equal to or more than machining reaction force; and deriving the predetermined relational expression by calculating the sideslip amount when the first-direction force detected by the force sensor has reached the maximum pressing force.

According to the above configuration, the relational expression defining the relation of the sideslip amount with the pressing force can be derived before the machining based on a detected value of the force sensor by pressing the machining tool against the workpiece in advance. With this, as compared to a method in which the sideslip amount with respect to the pressing force is successively calculated in accordance with the posture of the positioning control apparatus, highly accurate machining can be realized while significantly reducing the calculation amount during the machining. Further, since the relational expression is derived by actually pressing the machining tool against the workpiece, the deflection of the workpiece can also be considered, and therefore, the correction accuracy improves.

The predetermined value may be a value that is equal to or less than maximum static friction force between the tip end of the machining tool and the workpiece.

According to the above configuration, since the machining tool can be pressed against the workpiece such that the frictional force between the tip end of the machining tool and the workpiece becomes the maximum static friction force or less, the machining tool hardly slips on the workpiece.

In the step of machining the workpiece, a pair of plates may be friction-stirred and spot-welded to each other with the machining tool by friction stir spot welding.

A positioning control apparatus according to another aspect of the present invention is a positioning control apparatus configured to perform machining while pressing a tip end of a machining tool against a predetermined position on a machined surface of a workpiece, the positioning control apparatus including: a relational expression deriving portion configured to derive a predetermined relational expression before the machining, the relational expression defining a relation of a sideslip amount of the tip end of the machining tool in a second direction with pressing force generated when the tip end of the machining tool is pressed against the predetermined position in a first direction in a state where the tip end of the machining tool coincides with the predetermined position, the second direction being parallel to the machined surface of the workpiece, the first direction being perpendicular to the machined surface of the workpiece; a force sensor configured to detect the pressing force during the machining; a sideslip amount calculating portion configured to calculate the sideslip amount corresponding to the pressing force detected by the force sensor, in accordance with the predetermined relational expression at any time; a position command value correcting portion configured to correct a position command value of the positioning control apparatus based on the calculated sideslip amount; and a control portion configured to control an operation of the positioning control apparatus such that the positioning control apparatus machines the workpiece in accordance with the corrected position command value.

Advantageous Effects of Invention

According to the present invention, machining can be performed while preventing a positional displacement during the machining.

DESCRIPTION OF EMBODIMENTS

Embodiments of the present invention will be explained with reference to the drawings. In the following explanations and the drawings, the same reference signs are used for the same or corresponding components, and a repetition of the same explanation is avoided.

Embodiment 1

Configuration of Positioning Control Apparatus

Figure 1:
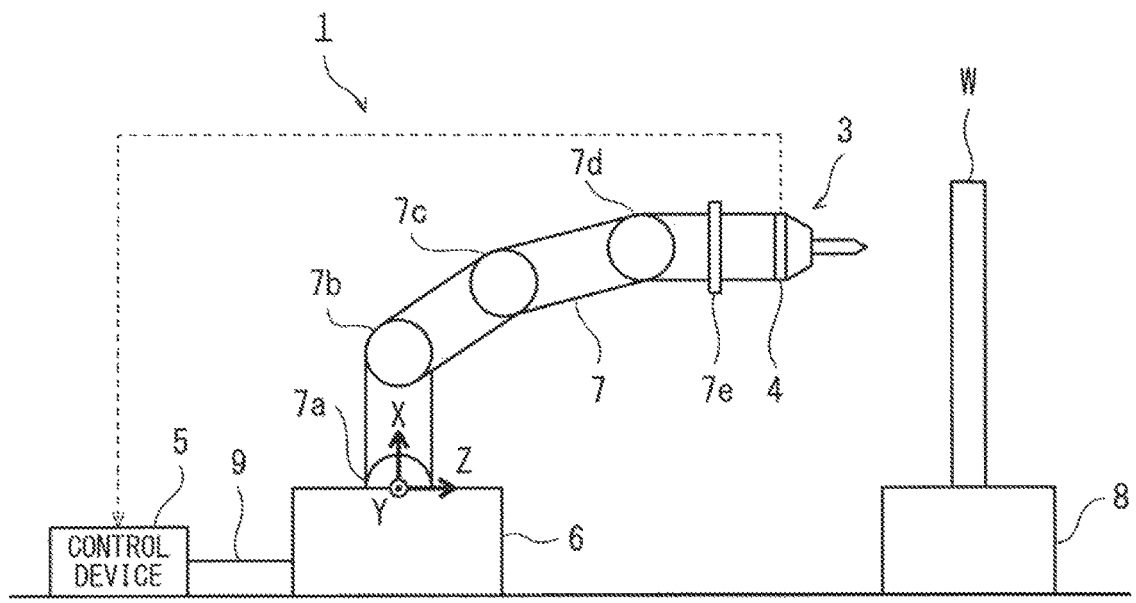
FIG. 1 is a diagram showing the configuration of a positioning control apparatus according to Embodiment 1 of the present invention.

FIG. 1 is a diagram showing the configuration of a positioning control apparatus according to Embodiment 1 of the present invention. As shown in FIG. 1, a positioning control apparatus 1 includes a machining tool 3, a force sensor 4, and a control device 5. The positioning control apparatus 1 performs machining while pressing a tip end of the machining tool 3 against a predetermined position on a machined surface (workpiece flat surface) of a workpiece W. In the present embodiment, the positioning control apparatus 1 is a vertically articulated robot.

The vertically articulated robot (hereinafter simply referred to as a "robot") includes: a base 6 placed on a mounting surface, such as a floor surface; and an arm 7 attached to the base 6. A coordinate system defined based on an upper surface of the base 6 is referred to as a base coordinate system of the robot. The arm 7 includes a plurality of joints 7a to 7d. The adjacent joints are connected to each other by a link. As one example, the arm 7 of the present embodiment includes four joints. A servo motor, an encoder, and the like (all of which are not shown) are incorporated in each joint. The servo motor drives the joint, and the encoder detects an angle of the joint. The position and posture of a flange 7e in the base coordinate system can be specified based on the angles of the joints of the arm 7 and the sizes of the links constituting the arm 7. It should be noted that the joints may be rotated or linearly moved. A flange-shaped tool attaching portion (hereinafter referred to as a "flange") 7e is provided at a tip end of the arm 7. A coordinate system defined based on an attaching surface of the flange 7e is referred to as a flange coordinate system. The machining tool 3 is attached to the flange 7e.

The machining tool 3 is attached to a tip end of the arm 7 of the robot. The robot makes the joints 7a to 7d of the arm 7 operate to move the machining tool 3 attached to the tip end of the arm 7. Thus, the robot performs machining of the workpiece W while pressing the tip end of the machining tool 3 against the workpiece W. In FIG. 1, a Z-axis direction in the base coordinate system of the robot coincides with a pressing direction in which the machining tool 3 is pressed against the workpiece W. In the present embodiment, a machining member used in the machining tool 3 is a drill including a pointed portion at its tip end. To be specific, the robot performs drilling with respect to the workpiece W.

The shape and material of the workpiece W that is a work target for the robot are not especially limited. For example, the shape of the workpiece W corresponds to the shape of a body part of an airplane. The material of the workpiece W is metal, such as aluminum alloy. The workpiece W is fixed to an upper portion of a worktable 8 with an attaching jig (not shown). In the present embodiment, the workpiece W is placed on the worktable 8 such that the machined surface thereof is parallel to a vertical direction. In FIG. 1, an X-Y plane in the base coordinate system of the robot coincides with the machined surface of the workpiece W.

The force sensor 4 is attached to the machining tool 3 and is configured to detect force applied to the tip end of the machining tool 3. The force sensor 4 outputs a detection signal to the control device 5 through wireless communication or wired communication.

The control device 5 acquires the detection signal from the force sensor 4 and controls a joint drive mechanism of the robot and the machining tool 3. In the present embodiment, the control device 5 is a robot controller including a computer, such as a microcontroller. The control device 5 is connected to a robot main body through a cable 9. The control device 5 is not limited to a single device and may be constituted by a plurality of devices.

Figure 2:
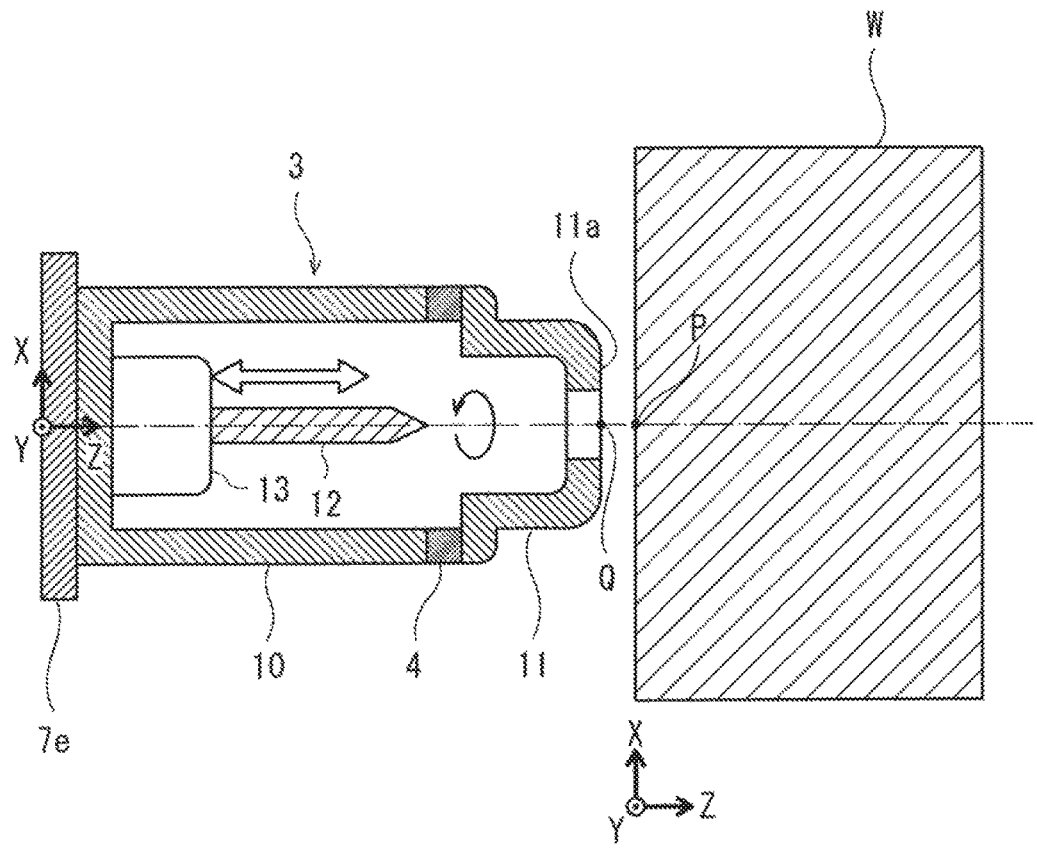
FIG. 2 is a sectional view showing the configuration of a machining tool of FIG. 1.

Next, the configuration of the machining tool 3 will be explained with reference to the sectional view of FIG. 2. As shown in FIG. 2, the machining tool 3 includes a tool main body 10, a pressing member 11, a machining member 12, and the force sensor 4. The flange coordinate system is defined based on the attaching surface of the flange 7e, and a workpiece coordinate system is defined based on a machining reference position P on the machined surface of the workpiece W.

The tool main body 10 has a cylindrical shape. One end of the tool main body 10 is fixed to the attaching surface of the flange 7e, and the other end of the tool main body 10 is attached to the pressing member 11 through the force sensor 4 having an annular shape. Or, one end (the flange 7e side) of the tool main body 10 may be attached to the flange 7e through the force sensor 4 having an annular shape, and the pressing member 11 may be attached to the other end (tip end side) of the tool main body 10. The shape of the force sensor 4 is not limited to the annular shape and may be a shape corresponding to the shape of the machining tool 3 or a method of attaching the force sensor 4 to the flange 7e. The tool main body 10 accommodates the machining member 12. The shape of the tool main body 10 is not limited to the cylindrical shape. A pressing surface 11a that is pressed against the machined surface of the workpiece W is formed at a tip end of the pressing member 11. A circular hole through which the drill passes is formed at a middle of the pressing surface 11a. The pressing surface 11a is pressed in the pressing direction in a state where a center position Q of the hole coincides with the machining reference position P on the machined surface of the workpiece W. In each of the flange coordinate system and the workpiece coordinate system in FIG. 2, the Z-axis direction coincides with the pressing direction in which the machining tool 3 is pressed against the workpiece W, and the X-Y plane coincides with the machined surface of the workpiece W.

The machining member 12 is the drill attached to a main shaft head 13 arranged in the tool main body 10 so as to be located close to the flange 7e. The machining member 12 is rotated by the main shaft head 13 about a center line of a main shaft. Further, in a state where the pressing surface 11a of the pressing member 11 is pressed against the machined surface of the workpiece W, the machining member 12 is linearly driven relative to the pressing member 11 by the main shaft head 13 to perform drilling on the machined surface. To be specific, at the time of the machining, a tip end of the machining member 12 projects from the circular hole of the pressing surface 11a to cut the machined surface of the workpiece W. A servo motor and an encoder (both not shown) are incorporated in the main shaft head 13. The servo motor rotates and linearly drives the machining member 12, and the encoder is one example of a detector capable of detecting the rotation or position of the machining member 12.

The force sensor 4 has an annular shape. The force sensor 4 is attached between the tool main body 10 and the pressing member 11 but may be attached between the flange 7e and the tool main body 10.

The force sensor 4 detects force received by the tip end of the machining tool 3 from the machined surface of the workpiece W. The force sensor 4 is, for example, a six-axis force sensor. The six-axis force sensor can detect: forces acting in directions along three axes (the X-axis, Y-axis, and Z-axis of the flange coordinate system in FIG. 2) perpendicular to one another; and moments acting around the respective axes. In the present embodiment, the force sensor 4 detects first-direction force (pressing force $F_Z$) acting in a first direction (a positive direction of the Z-axis in FIG. 2) perpendicular to the machined surface (X-Y plane in FIG. 2) of the workpiece W, the pressing force $F_Z$ being a part of the force received by the tip end of the machining tool 3 from the machined surface of the workpiece W during the machining. Therefore, the force sensor 4 may be configured to detect only a force component acting in one direction.

Figure 3:
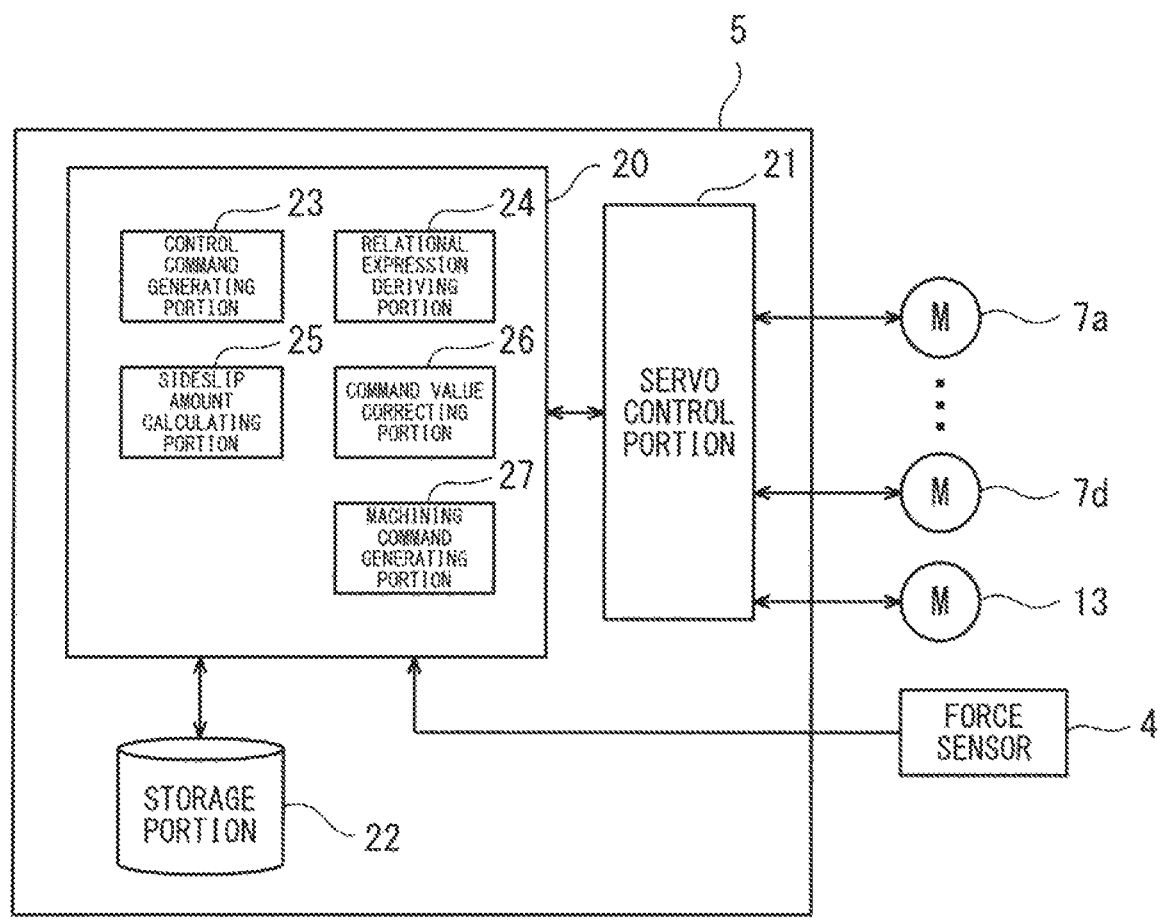
FIG. 3 is a block diagram showing the configuration of a control device of FIG. 1.

Next, the configuration of the control device 5 will be explained with reference to the block diagram of FIG. 3. As shown in FIG. 3, the control device 5 includes a calculating portion 20, a servo control portion 21, a storage portion 22, and an interface portion (not shown). Targets to be controlled are the servo motors configured to drive the joints 7a to 7d of the arm 7 and the servo motor configured to drive the main shaft head 13 of the machining tool 3. An encoder and a current sensor are attached to each servo motor. The encoder detects the position of the motor (i.e., a rotation angle position of a rotor with respect to a reference rotation angle position of the rotor), and the current sensor detects a current value flowing through the motor. The control device 5 acquires, through the interface portion (not shown), the position of the motor detected by the encoder and the current value flowing through the servo motor and detected by the current sensor.

For example, the storage portion 22 stores in advance: a basic program of the robot controller; an operation program of the robot; and parameters, such as positions from an operation start position to the machining reference position P of the workpiece W, the machining reaction force with respect to the workpiece W at the time of the machining, and maximum static friction force between the workpiece W and the tip end of the machining tool 3. Further, the storage portion 22 also stores in advance information, such as a machining program necessary for the machining.

The calculating portion 20 is a calculating device configured to execute various calculation processing. The calculating portion 20 executes a predetermined program, stored in the storage portion 22, to realize respective functional blocks (i.e., to operate as the functional blocks) including a control command generating portion 23, a relational expression deriving portion 24, a sideslip amount calculating portion 25, a command value correcting portion 26, and a machining command generating portion 27.

The control command generating portion 23 generates a position command value of the motor, which drives the joint (7a to 7d), based on the operation program of the robot and generates a speed command value based on a deviation between the generated position command value and a detected value (actual value) of the encoder. Then, the control command generating portion 23 generates a torque command value (current command value) based on a deviation between the generated speed command value and a present speed value and generates a control command based on a deviation between the generated current command value and a detected value (actual value) of the current sensor. Thus, the control command generating portion 23 outputs the generated control command to the servo control portion 21.

The relational expression deriving portion 24 derives a predetermined relational expression before the machining. The predetermined relational expression defines a relation of a sideslip amount of the tip end of the machining tool in a second direction (a direction parallel to the X-axis in FIG. 2) with the pressing force $F_Z$ generated when the tip end of the machining tool 3 is pressed against the machined surface of the workpiece W in the first direction (the positive direction of the Z-axis in FIG. 2) in a state where the tip end of the machining tool 3 coincides with the predetermined position P on the machined surface (the X-Y plane in FIG. 2) of the workpiece W. The second direction is parallel to the machined surface of the workpiece W, and the first direction is perpendicular to the machined surface of the workpiece W.

The sideslip amount calculating portion 25 calculates the sideslip amount corresponding to the pressing force $F_Z$ detected by the force sensor 4, in accordance with the predetermined relational expression at any time.

The command value correcting portion 26 corrects the position command value of the motor configured to drive the joint (7a to 7d) and outputs the corrected position command value to the control command generating portion 23.

The machining command generating portion 27 generates a position command value of the main shaft head 13 based on the machining program and generates a speed command value based on a deviation between the generated position command value and a detected value (actual value) of the encoder. Then, the machining command generating portion 27 generates a torque command value (current command value) based on a deviation between the generated speed command value and a present speed value and generates a machining command based on a deviation between the generated current command value and a detected value (actual value) of the current sensor. Thus, the machining command generating portion 27 outputs the generated machining command to the servo control portion 21.

The servo control portion 21 generates a current based on the supplied command value (the control command or the machining command) and supplies the generated current to the servo motor of the joint (7a to 7d) or the servo motor of the main shaft head 13. Thus, the operation of the joint (7a to 7d) of the arm 7 or the operation of the main shaft head 13 of the machining tool 3 is controlled.

Deflection of Positioning Control Apparatus

Figure 4:
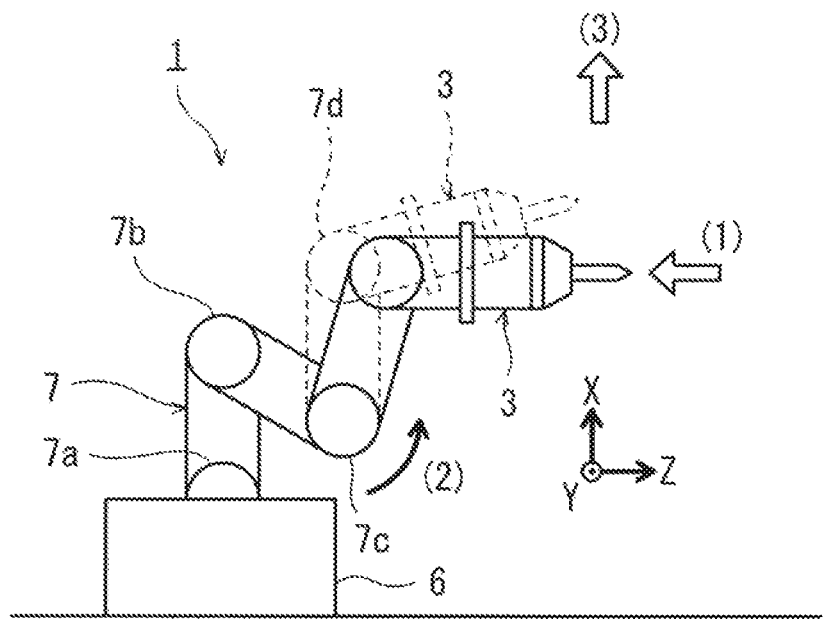
FIG. 4 is a schematic diagram showing a motion that occurs by deflection of the positioning control apparatus.

In order to improve machining accuracy of the positioning control apparatus 1, the present inventors have analyzed deflection of the positioning control apparatus 1. FIG. 4 is a schematic diagram showing one example of a motion that occurs by the deflection of the positioning control apparatus 1. As shown in FIG. 4, it is assumed that the tip end of the machining tool 3 attached to an arm tip of the positioning control apparatus 1 is pushed (in a negative direction of the Z-axis in FIG. 4). As a result, the joint 7c of the arm 7 deflects in a rotational direction. At this time, a motion (pushed motion) in which the tip end of the machining tool 3 is lifted upward (in a positive direction of the X-axis in FIG. 4) occurs.

Figure 5:
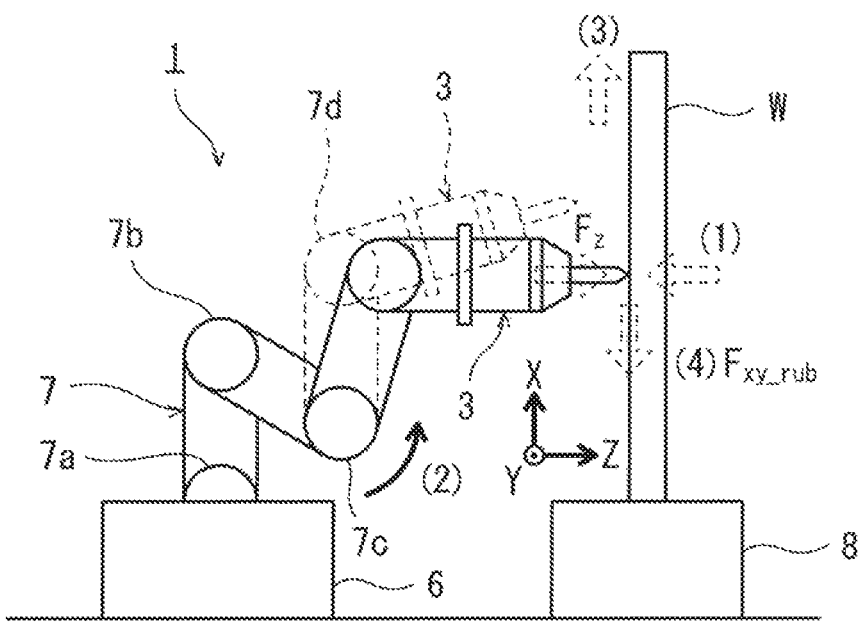
FIG. 5 is a schematic diagram showing a motion that occurs when the machining tool is pressed against a workpiece.

Next, it is assumed that the machining tool 3 is actually pressed against the workpiece W. FIG. 5 is a schematic diagram showing a motion that occurs when the tip end of the machining tool 3 is pressed against the workpiece W. As shown in FIG. 5, when the machining tool 3 is pressed against the workpiece W, the pushed motion occurs (in the positive direction of the X-axis in FIG. 5) by the reaction (in the negative direction of the Z-axis in FIG. 5) of the pressing force $F_Z$. Simultaneously, frictional force $F_{xy\_rub}$ shown in FIG. 5 is generated between the tip end of the machining tool 3 and the workpiece W. The generated frictional force $F_{xy\_rub}$ acts in a direction that hinders the pushed motion, i.e., in a direction parallel to the machined surface of the workpiece W (i.e., in a negative direction of the X-axis in FIG. 5). Further, when the pressing force $F_Z$ is increased, the motion in which the tip end of the machining tool 3 is lifted upward against the frictional force $F_{xy\_rub}$ occurs, and this causes a positional displacement of the tip end of the machining tool 3. Hereinafter, the positional displacement of the machining tool 3 in a direction parallel to the machined surface of the workpiece W by the pressing force $F_Z$ is also referred to as a sideslip There is a method in which: the deflection of the positioning control apparatus 1 is modeled; and regarding the posture which may be taken by the positioning control apparatus 1, the sideslip amount with respect to the pressing force $F_Z$ is successively calculated by numerical analysis. This method is theoretically possible but is not realistic since the calculation amount is huge.

Pre-analysis by FEM

Figure 6:
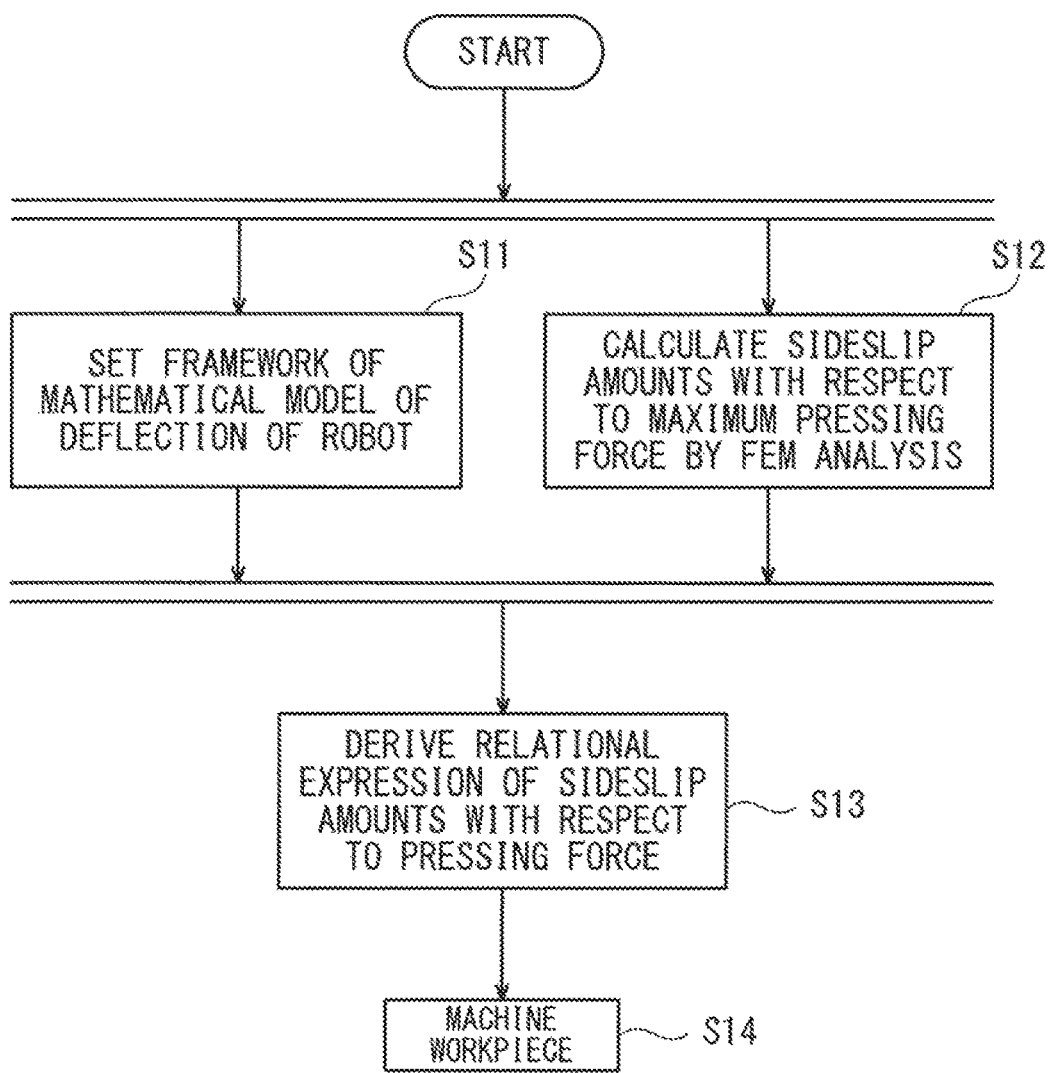
FIG. 6 is a flow chart showing one example of processing of the control device before machining.

In the present embodiment, the relational expression defining the relation of the sideslip amount with the pressing force $F_Z$ is derived in advance by finite element method (FEM) analysis. FIG. 6 is a flow chart showing one example of the processing of the control device 5 before the machining. First, the control device 5 (the relational expression deriving portion 24) sets a framework of a mathematical model by using a plurality of finite elements, the mathematical model being prepared by modeling the deflection of the positioning control apparatus 1 (Step S11 in FIG. 6). It should be noted that the deflection of the positioning control apparatus 1 denotes the deflection of the joints 7a to 7d of the arm 7 of the robot when the tip end of the machining tool 3 is pressed against the workpiece W (see FIG. 5).

The control device 5 (the relational expression deriving portion 24) calculates sideslip amounts $\Delta x_{\_max}$ and $\Delta y_{\_max}$ with respect to maximum pressing force $F_{Z\_max}$ by the finite element method analysis (Step S12 in FIG. 6). The maximum pressing force $F_{Z\_max}$ is set to force equal to or more than the machining reaction force. The finite element method analysis is a publicly known structure analysis. The finite element method analysis is performed by: dividing the positioning control apparatus 1 (robot) as an analysis target into elements each having a simple shape, such as a triangle or a square; and performing calculations for the respective elements.

Next, the sideslip amounts $\Delta x_{\_max}$ and $\Delta y_{\_max}$ with respect to the maximum pressing force $F_{Z\_max}$, which are calculated in Step S12, are substituted in the mathematical model set in Step S11. With this, a relational expression (1) of the sideslip amounts $\Delta x$ and $\Delta y$ with respect to the pressing force $F_Z$ is derived (Step S13 in FIG. 6).

$$\Delta x = \Delta x_{\_max} \times (F_Z/F_{Z\_max}),$$
$$\Delta y = \Delta y_{\_max} \times (F_Z/F_{Z\_max}) \qquad (1)$$

It should be noted that: $\Delta x$ denotes the sideslip amount of the X-axis; $\Delta y$ denotes the sideslip amount of the Y-axis; $\Delta x_{\_max}$ denotes the sideslip amount with respect to the maximum pressing force $F_{Z\_max}$; $\Delta y_{\_max}$ denotes the sideslip amount with respect to the maximum pressing force $F_{Z\_max}$; and $F_Z$ denotes a monitor value of the force sensor in the Z-axis direction.

As above, in the present embodiment, the relational expression defining the relation of the sideslip amounts $\Delta x$ and $\Delta y$ with the pressing force $F_Z$ is derived in advance before the machining.

Workpiece Machining

Then, the positioning control apparatus 1 starts workpiece machining (Step S14 in FIG. 6). The control command generating portion 23 generates the position command value of the joint (7a to 7d), the position command value being set such that the tip end of the machining tool 3 (i.e., the center position Q of the pressing surface 11a of the pressing member 11) is pressed against the machined surface of the workpiece W in a state where the tip end of the machining tool 3 is moved from a predetermined position to coincide with the machining reference position P on the machined surface of the workpiece W. Then, the control command generating portion 23 generates the speed command value based on the deviation between the generated position command value and the detected value (actual value) of the encoder (see FIG. 2) and generates the torque command value (current command value) based on the deviation between the generated speed command value and the present speed value. The control command generating portion 23 generates the control command based on the deviation between the generated current command value and the detected value (actual value) of the current sensor and outputs the generated control command to the servo control portion 21.

The machining command generating portion 27 generates the position command value of the main shaft head 13, the position command value being set such that the drill of the machining tool 3 moves from the machining reference position P on the machined surface of the workpiece W to machine the workpiece W by a predetermined depth. Then, the machining command generating portion 27 generates the speed command value based on the deviation between the generated position command value and the detected value (actual value) of the encoder and generates the torque command value (current command value) based on the deviation between the generated speed command value and the present speed value. The machining command generating portion 27 generates the machining command based on the deviation between the generated current command value and the detected value (actual value) of the current sensor and outputs the generated machining command to the servo control portion 21.

Figure 7:
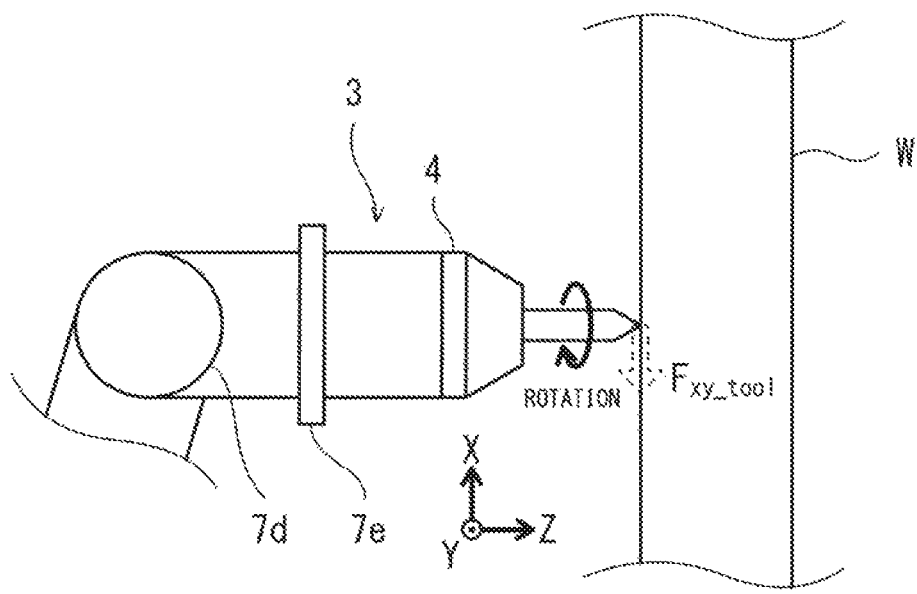
FIG. 7 is a schematic diagram showing the positioning control apparatus during the machining.
Figure 8:
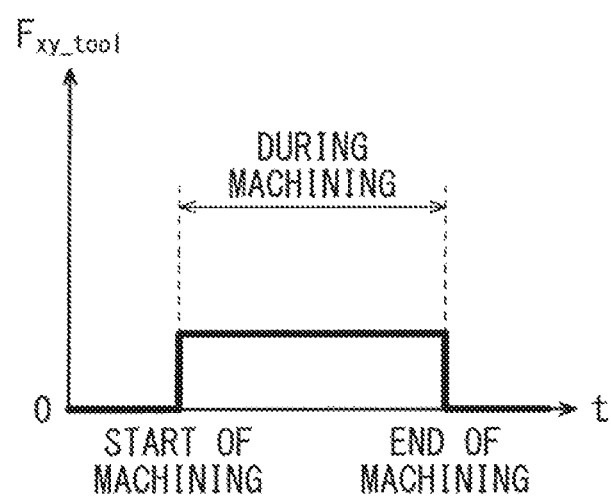
FIG. 8 is a graph showing one example of a time change of tool generating force during the machining.

The servo control portion 21 generates a current based on the supplied command value (the control command or the machining command) and supplies the generated current to the servo motor of the joint (7a to 7d) or the servo motor of the main shaft head 13. Thus, the operations of the joint (7a to 7d) of the arm 7 or the operation of the main shaft head 13 of the machining tool 3 is controlled. FIG. 7 is a schematic diagram showing the positioning control apparatus 1 during the machining. As shown in FIG. 7, force (hereinafter referred to as "tool generating force $F_{xy\_tool}$") acting in a direction parallel to the machined surface (X-Y plane in FIG. 7) of the workpiece W is generated during the machining. To be specific, when performing the machining while pressing the tip end of the machining tool 3 against the machined surface of the workpiece W, the tool generating force $F_{xy\_tool}$ is generated by the machining in addition to the frictional force $F_{xy\_rob}$ (see FIG. 5) generated between the tip end of the machining tool 3 and the workpiece W. In FIG. 7, the tool generating force $F_{xy\_tool}$ acts downward (in the negative direction of the X-axis in FIG. 7) with respect to the tip end of the machining tool 3 due to the rotation of the machining tool 3. FIG. 8 is a graph showing one example of a time change of the tool generating force at the time of the machining. As shown in FIG. 8, the tool generating force $F_{xy\_tool}$ is generated when the machining (for example, drill rotation) is started, and disappears when the machining is stopped. The tool generating force $F_{xy\_tool}$ does not depend on the pressing force $F_Z$. When performing the machining while pushing the workpiece W, the frictional force $F_{xy\_rob}$ and the tool generating force $F_{xy\_tool}$ are generated at the same time. Therefore, the positioning control apparatus 1 moves in a direction (the negative direction of the X-axis) different from the direction (the positive direction of the X-axis) of the above pushed motion of the positioning control apparatus 1. As a result, the position of the tip end of the machining tool 3 is not kept, and the sideslip occurs during the machining. In the drilling of the present embodiment, the positional displacement of the tip end of the drill occurs, and this deteriorates the positional accuracy of the hole and the accuracy of the diameter of the hole.

Sideslip Correction Processing

Figure 9:
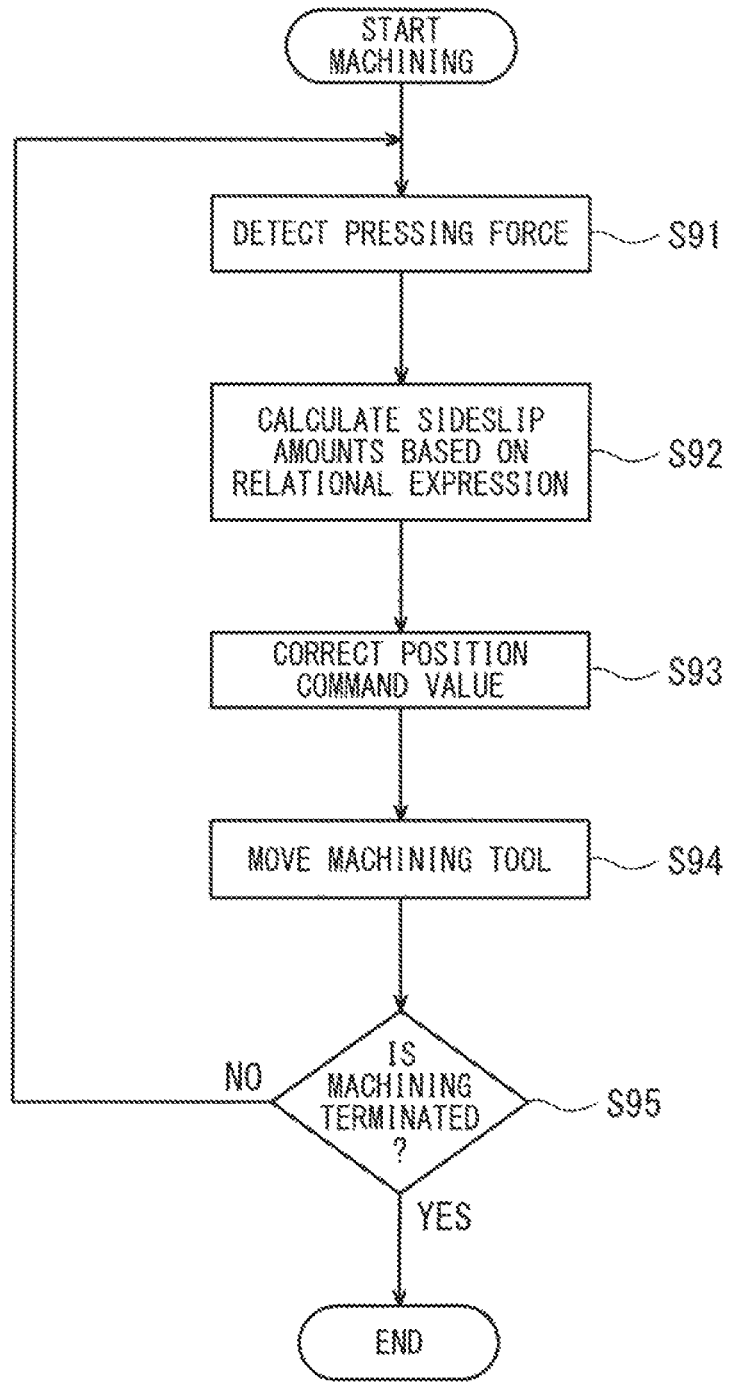
FIG. 9 is a flow chart showing one example of sideslip correction processing during the machining.

Therefore, in the present embodiment, processing of correcting the sideslip during the machining is performed. FIG. 9 is a flow chart showing one example of the sideslip correction processing.

First, the force sensor 4 detects the pressing force $F_Z$ during the machining (Step S91 in FIG. 9). The control device 5 acquires the pressing force $F_Z$ detected by the force sensor 4, the pressing force $F_Z$ being a part of the force received by the tip end of the machining tool 3 from the machined surface of the workpiece W.

Next, in accordance with the relational expression (1) derived in Steps S11 to S13 (see FIG. 6), the control device 5 (the sideslip amount calculating portion 25) calculates at any time the sideslip amounts Δx and Δy corresponding to the pressing force $F_Z$ detected by the force sensor 4 (Step S92 in FIG. 9).

$$\Delta x = \Delta x_{\_max} \times (F_Z/F_{Z\_max}),$$

$$\Delta y = \Delta y_{\_max} \times (F_Z/F_{Z\_max}) \quad (1)$$

It should be noted that: Δx denotes the sideslip amount of the X-axis; Δy denotes the sideslip amount of the Y-axis; $\Delta x_{\_max}$ denotes the sideslip amount with respect to the maximum pressing force $F_{Z\_max}$; $\Delta y_{\_max}$ denotes the sideslip amount with respect to the maximum pressing force $F_{Z\_max}$; and $F_Z$ denotes the monitor value of the force sensor in the pressing direction (Z-axis direction). As above, in the present embodiment, a proportional relation is used as one example of the relation of each of the sideslip amounts Δx and Δy with the pressing force $F_Z$.

Next, based on the calculated sideslip amounts Δx and Δy, the command value correcting portion 26 corrects the position command value of the motor configured to drive the joint (7a to 7d) (Step S93 in FIG. 9). A correction amount for the position command value is a value that cancels out the sideslip amounts Δx and Δy. The correction amount is added to the position command value. The command value correcting portion 26 outputs the corrected position command value to the control command generating portion 23.

Next, the control device 5 controls the operation of the arm 7 based on the corrected position command value to move the machining tool 3 (Step S94 in FIG. 9). The control command generating portion 23 generates the speed command value based on the deviation between the corrected position command value and the detected value (actual value) of the encoder and generates the torque command value (current command value) based on the deviation between the generated speed command value and the present speed value. The control command generating portion 23 generates the control command based on the deviation between the generated current command value and the detected value (actual value) of the current sensor and outputs the generated control command to the servo control portion 21. The servo control portion 21 generates a current based on the supplied control command and supplies the generated current to the servo motor of the joint (7a to 7d).

Figure 10:
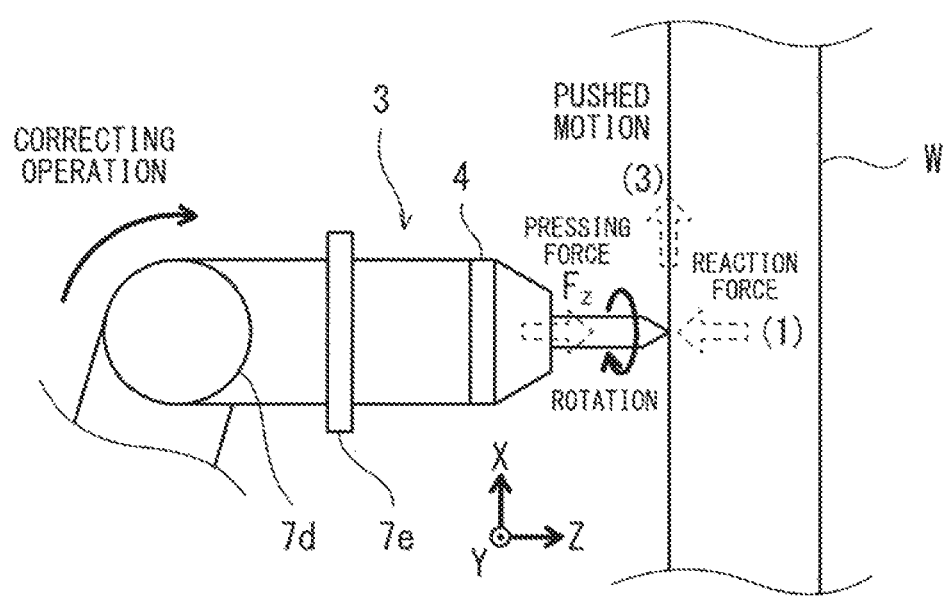
FIG. 10 is a schematic diagram showing one example of an operation of the positioning control apparatus in the sideslip correction processing.

FIG. 10 is a schematic diagram showing one example of the operation of the positioning control apparatus 1 in the sideslip correction processing. As shown in FIG. 10, each of the joints 7a to 7d of the arm 7 is controlled based on the corrected position command value. With this, the operation (correcting operation) of cancelling out the pushed motion caused by the reaction force of the pressing force $F_Z$ can be realized during the machining (during the rotation). As above, the machining can be performed while using only the pressing force $F_Z$ and performing the correction for preventing the occurrence of the positional displacement of the tip end of the machining tool 3. The above sideslip correction processing (Steps S91 to S94) is continuously performed until the machining terminates. With this, the position of the tip end of the machining tool 3 can be kept.

Therefore, according to the present embodiment, the sideslip amounts Δx and Δy corresponding to the pressing force $F_Z$ during the machining can be calculated in accordance with the relational expression (1) derived in advance. With this, while preventing the occurrence of the positional displacement of the tip end of the machining tool 3, the machining can be performed without being influenced by the tool generating force $F_{xy\_tool}$ generated by the machining tool 3.

The relational expression (1) defining the relation of the sideslip amounts Δx and Δy with the pressing force $F_Z$ is derived by the numerical analysis before the machining. Therefore, as compared to a method in which the sideslip amount with respect to the pressing force is successively calculated by the numerical analysis in accordance with the posture of the positioning control apparatus 1, highly accurate machining can be realized while significantly reducing the calculation amount during the machining.

Embodiment 2

Hereinafter, Embodiment 2 will be explained with reference to FIGS. 11 to 13. The positioning control apparatus 1 of the present embodiment is the same in basic configuration as that of Embodiment 1. Hereinafter, explanations of the same components as in Embodiment 1 are omitted, and only components different from Embodiment 1 will be explained.

Pre-measurement by Pressing

In Embodiment 1, the relational expression (1) defining the relation of the sideslip amounts Δx and Δy with the pressing force $F_Z$ is derived by the finite element method (FEM) analysis. The present embodiment is different from Embodiment 1 in that the relational expression defining the relation of the sideslip amounts Δx and Δy with the pressing force $F_Z$ is derived by measuring in advance the deflection generated by actually pressing the machining tool 3 against the workpiece W.

Figure 11:
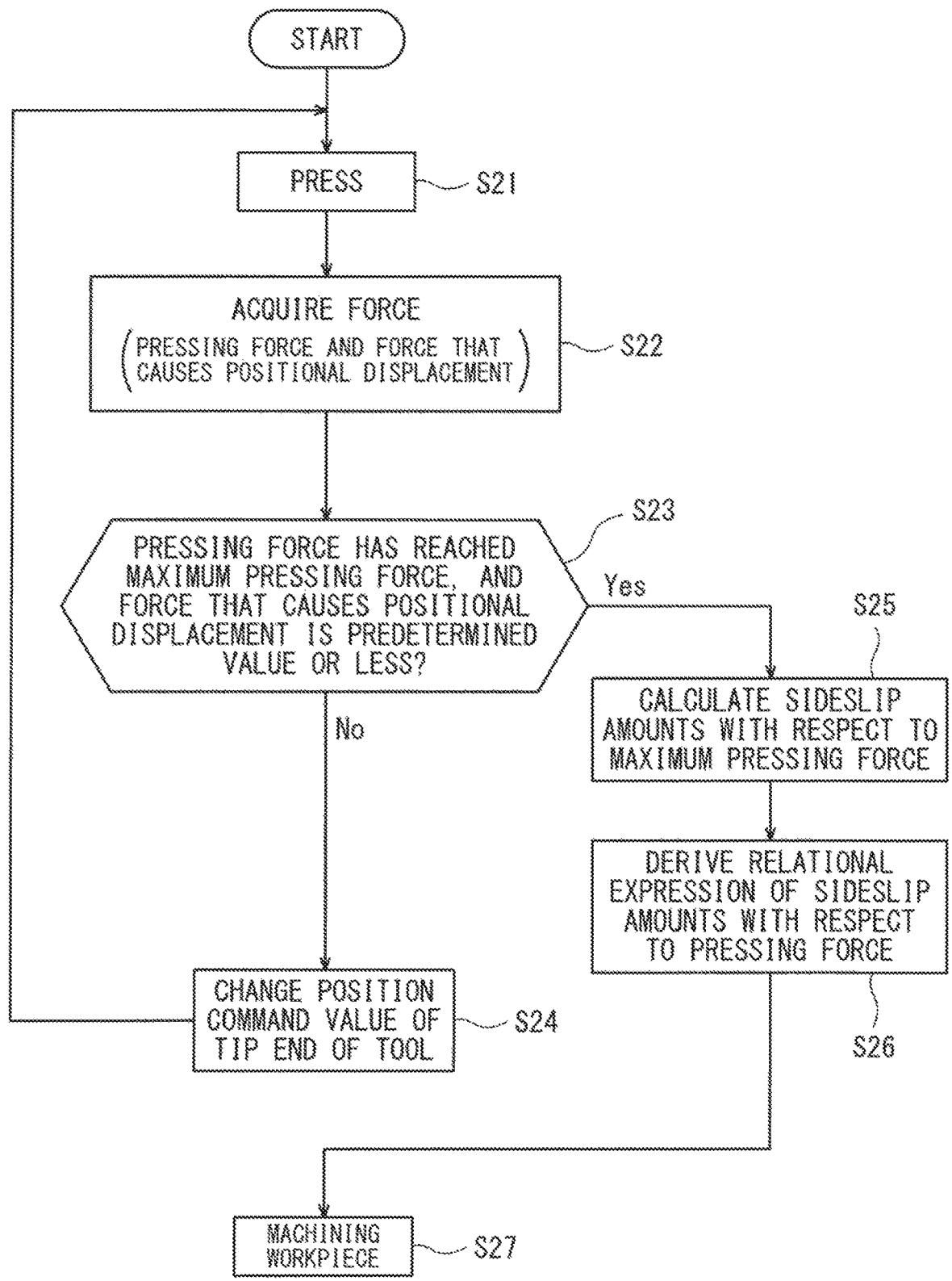
FIG. 11 is a flow chart showing one example of processing of the control device before the machining in Embodiment 2 of the present invention.
Figure 12:
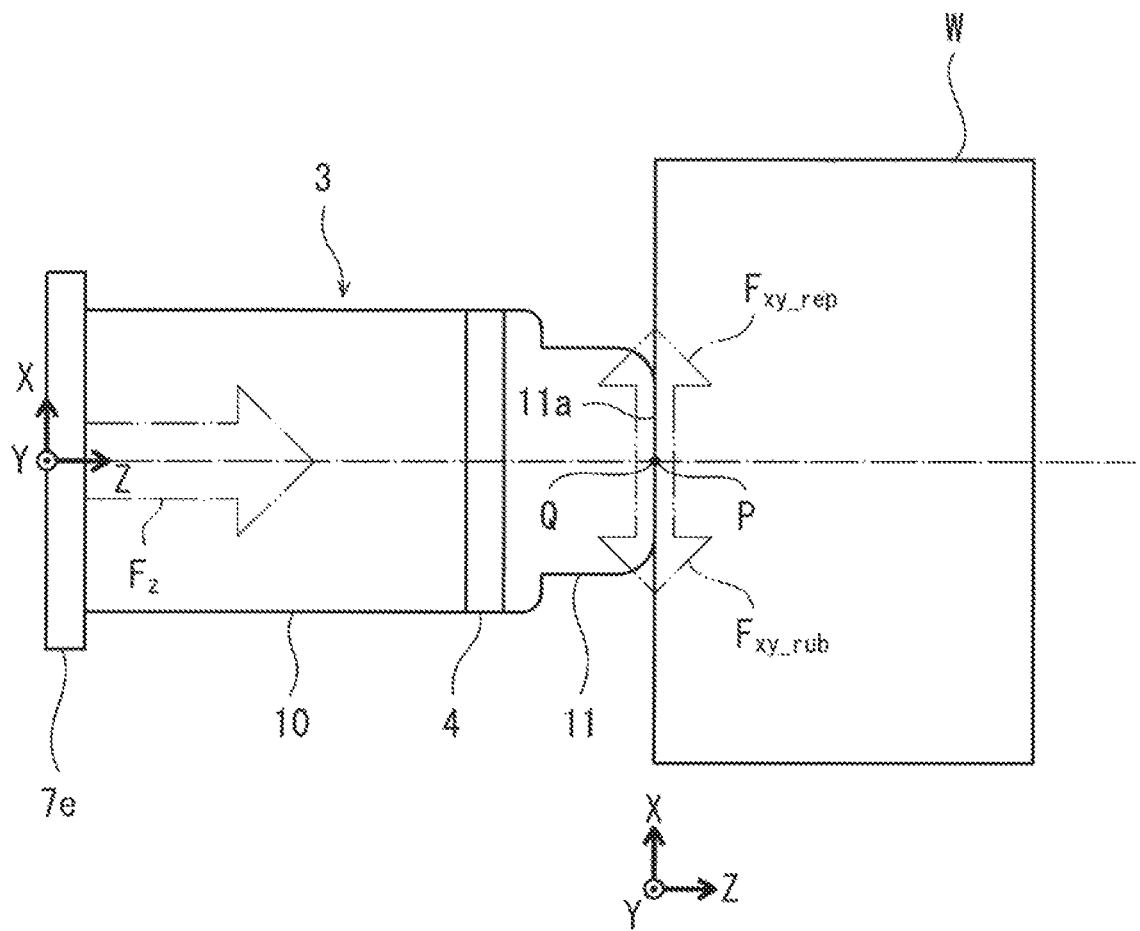
FIG. 12 is a diagram for explaining a pressing operation before the machining.

FIG. 11 is a flow chart showing one example of the processing of the control device 5 before the machining. First, the control device 5 presses the machining tool 3 against the workpiece W (Step S21 in FIG. 11). As shown in FIG. 12, the control device 5 controls the arm 7 such that the tip end of the machining tool 3 coincides with the machining reference position P on the machined surface. The control device 5 (the control command generating portion 23) generates the position command value of the joint shaft (7a to 7d), the position command value being set such that the tip end of the machining tool 3 moves from the predetermined position to coincide with the machining reference position P on the machined surface of the workpiece W. Then, the control device 5 (the control command generating portion 23) generates the speed command value based on the deviation between the generated position command value and the detected value (actual value) of the encoder and generates the torque command value (current command value) based on the deviation between the generated speed command value and the present speed value. The control device 5 (control command generating portion 23) generates the control command based on the deviation between the generated current command value and the detected value (actual value) of the current sensor and outputs the generated control command to the servo control portion 21. The tip end of the machining tool 3 denotes the center position Q on the pressing surface 11a at the tip end of the machining tool 3. The position command values of the joint shafts 7a to 7d in a state where the tip end of the machining tool 3 coincides with the machining reference position P on the machined surface of the workpiece W are represented by initial values Q1 (i.e., $J_{1-1}$, $J_{2-1}$, $J_{3-1}$, and $J_{4-1}$). The position command values are represented by coordinate values based on the base coordinate system.

Then, the control device 5 (the control command generating portion 23) generates the position command value of the joint shaft (7a to 7d), the position command value being set such that the tip end Q of the machining tool 3 is pressed against the machined surface of the workpiece W in a state where the tip end Q of the machining tool 3 coincides with the machining reference position P on the machined surface. Then, the control device 5 (the control command generating portion 23) generates the speed command value based on the deviation between the generated position command value and the detected value (actual value) of the encoder and generates the torque command value (current command value) based on the deviation between the generated speed command value and the present speed value. The control device 5 (the control command generating portion 23) generates the control command based on the deviation between the generated current command value and the detected value (actual value) of the current sensor and outputs the generated control command to the servo control portion 21. At this time, as shown in FIG. 13, the force sensor 4 detects the first-direction force (pressing force $F_Z$) and second-direction force $F_{xy\_rep}$ (hereinafter referred to as "force $F_{xy\_rep}$ that causes the positional displacement"). The pressing force $F_Z$ acts in the first direction perpendicular to the machined surface of the workpiece and is a part of the force received by the tip end Q of the machining tool 3 from the machined surface of the workpiece. The force $F_{xy\_rep}$ acts in the second direction parallel to the machined surface of the workpiece and is a part of the force received by the tip end Q of the machining tool 3 from the machined surface of the workpiece. Hereinafter, it is assumed that the force $F_{xy\_rep}$ that causes the positional displacement acts upward.

Figure 13:
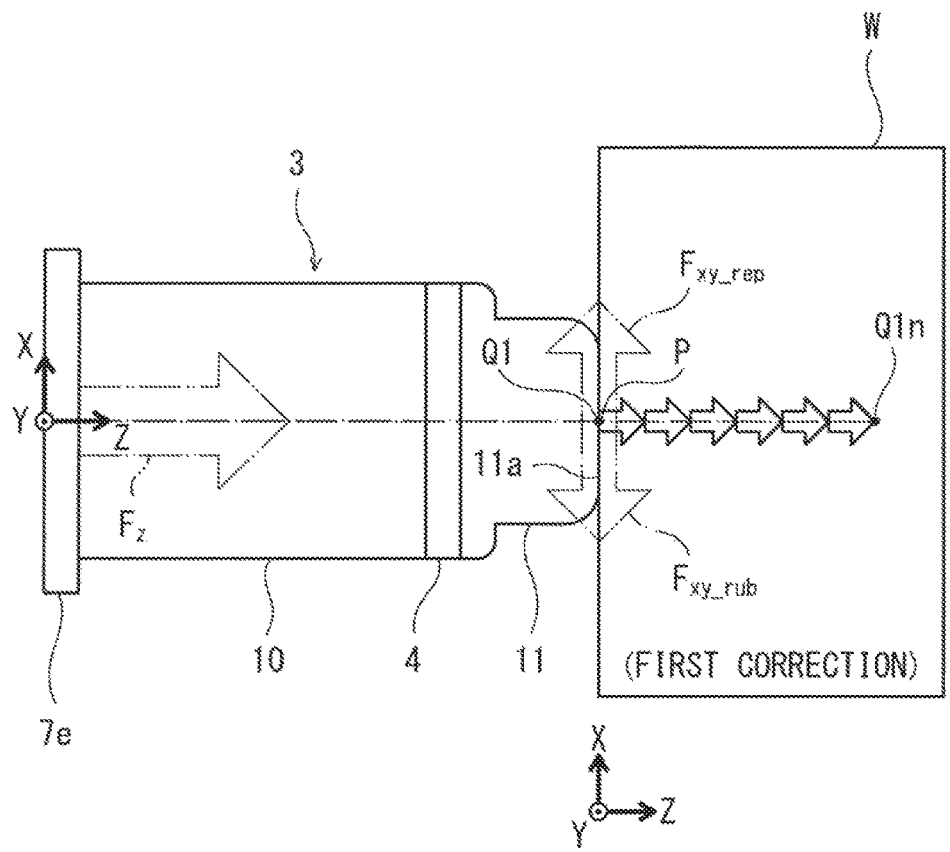
FIG. 13 is a diagram for explaining correction processing of correcting a position command value of the machining tool.

In FIG. 13, $F_{xy\_rub}$ denotes frictional force acting in an opposite direction to the force $F_{xy\_rep}$ that causes the positional displacement.

Next, the control device 5 acquires the detection signal (the pressing force $F_Z$ and the force $F_{xy\_rep}$ that causes the positional displacement) from the force sensor 4 (Step S22).

Next, the control device 5 determines whether or not the pressing force $F_Z$ has reached a target value and whether or not the force $F_{xy\_rep}$ that causes the positional displacement of the tip end of the machining tool 3 is a predetermined value or less (Step S23). In the present embodiment, the target value of the pressing force $F_Z$ is set to the maximum pressing force $F_{Z\_max}$ that is equal to or more than the machining reaction force. The predetermined value of the force $F_{xy\_rep}$ that causes the positional displacement is, for example, the maximum static friction force between the tip end of the machining tool 3 and the workpiece W. If the result of the determination is YES, the process proceeds to Step S25.

If the result of the determination is NO, the control device 5 executes correction processing of correcting the position command value of the tip end Q of the machining tool 3 (Step S24). As shown in FIG. 13, the tip end of the machining tool is further pressed against the workpiece W while changing the position command values Q1 (i.e., $J_{1-1}$, $J_{2-1}$, $J_{3-1}$, and $J_{4-1}$) of the position Q of the tip end of the machining tool in a direction (for example, in the negative direction of the X-axis in FIG. 13) by which the force $F_{xy\_rep}$ that causes the positional displacement is canceled out so as not to exceed the predetermined value. At this time, a change amount of each position command value of the position Q of the tip end of the machining tool 3 is calculated in accordance with the magnitude of the deviation between the pressing force $F_Z$ and the target value and the magnitude of a correction amount of the force $F_{xy\_rep}$ that causes the positional displacement. Steps S21 to S24 are repeatedly performed until the result of the determination in Step S23 becomes YES. For example, final values of the position command values of the machining tool 3 when the pressing force F1 has reached the target value by the pressing operation performed n times are represented by corrected position command values Q1n (i.e., $J_{1-n}$, $J_{2-n}$, $J_{3-n}$, and $J_{4-n}$).

If YES in Step S23, the control device 5 calculates the sideslip amounts $\Delta x_{max}$ and $\Delta y_{max}$ generated when the first-direction force (pressing force $F_Z$) detected by the force sensor 4 has reached the maximum pressing force $F_{Z\_max}$ (Step S25). Next, the relational expression (1) defining the relation of the sideslip amounts $\Delta x$ and $\Delta y$ with the pressing force $F_Z$ is derived based on the sideslip amounts $\Delta x_{max}$ and $\Delta y_{max}$ calculated in Step S25 with respect to the maximum pressing force $F_{Z\_max}$ (Step S26).

After that, as with Embodiment 1 (Steps S91 to S95 in FIG. 9), the positioning control apparatus 1 performs processing of correcting the sideslip during the machining by using the relational expression (1). With this, in the present embodiment, while preventing the occurrence of the positional displacement of the tip end of the machining tool 3, the machining can be performed without being influenced by the tool generating force $F_{xy\_tool}$ generated by the machining tool 3.

In the present embodiment, by pressing the machining tool 3 against the workpiece W before the machining, the relational expression (1) defining the relation of the sideslip amounts $\Delta x$ and $\Delta y$ with the pressing force $F_Z$ can be derived based on the detected value of the force sensor 4. With this, as compared to the method in which the sideslip amount with respect to the pressing force is successively calculated in accordance with the posture of the positioning control apparatus 1, highly accurate machining can be realized while significantly reducing the calculation amount during the machining. Further, since the relational expression (1) is derived by actually pressing the machining tool 3 against the workpiece W, the deflection of the workpiece W can also be considered, and therefore, the correction accuracy improves.

According to the present embodiment, since the machining tool 3 can be pressed against the workpiece W such that the frictional force between the tip end of the machining tool 3 and the workpiece W becomes the maximum static friction force or less, the machining tool 3 hardly slips on the workpiece W.

Other Embodiments

In the present embodiment, the relation of the sideslip amounts $\Delta x$ and $\Delta y$ with the pressing force $F_z$ is the proportional relation as shown by the relational expression (1). However, as long as the relational expression defines the relation of the sideslip amounts $\Delta x$ and $\Delta y$ with the pressing force $F_z$ in advance, a non-linear relational expression may be adopted. For example, a quadratic function may be adopted.

Figure 14:
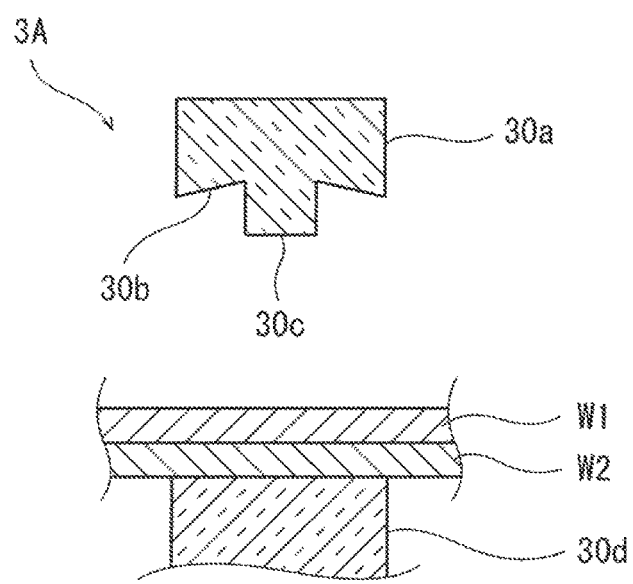
FIG. 14 is a sectional view showing a modified example of the machining tool according to the above embodiment.

The machining tool 3 of the above embodiment separately includes the machining member (drill) 12 and the pressing member 11 (see FIG. 2). However, the machining member 12 and the pressing member 11 may be integrated with each other as long as the machining is performed with respect to the machined surface of the workpiece W in a state where the machining member 12 is pressed against the machined surface. For example, an auto riveting unit may be adopted. FIG. 14 is a sectional view showing a modified example of the machining tool 3. As shown in FIG. 14, a machining tool 3A according to the present modified example is used in friction spot joining (FSJ). The machining tool 3A includes a tool main body portion 30a, a shoulder portion 30b, and a pin portion 30c and is provided so as to be able to contact with and separate from a surface of a plate W1 which surface is located opposite to a plate W2. The pin portion 30c projects from the main body portion 30a toward a backing portion 30d and is surrounded by the shoulder portion 30b. The tool 3A is driven by a motor (not shown) to move toward and away from the plates W1 and W2 in a direction along a center axis of the pin portion 30c. Further, the tool 3A is driven by a motor (not shown) to rotate about the center axis of the pin portion 30c. The driving of these motors is controlled by, for example, the control device 5. To be specific, in the present modified example, a pair of plates can be friction-stirred and spot-welded to each other with a machining tool by friction stir spot welding.

In the present embodiment, the position command values of the robot are corrected. However, the speed command values (specifically, the speed command values of the joint shafts 7a to 7d corresponding to the position Q of the tip end of the machining tool 3) of the robot may be corrected. In this case, for example, the control device 5 calculates a difference between a previous position of each joint shaft and a current position of each joint shaft (i.e., a movement distance of each joint shaft) and calculates the speed command value based on this difference. Further, the torque command value of the robot (specifically, the torque command values of the joint shafts 7a to 7d corresponding to the position Q of the tip end of the machining tool 3) may be corrected. In this case, from the movement distance of the robot arm tip which distance is necessary for the output of the force, the movement distance of each joint shaft for realizing the movement distance of the robot arm tip is calculated. Then, joint torque necessary to output the movement distance of each joint shaft is input as the torque command value.

The control device 5 may control the arm 7 such that the tip end of the machining tool 3 is pressed against the machined surface in a state where the position and posture of the tip end of the machining tool 3 coincide with the machining reference position on the machined surface. Then, the control device 5 may execute the correction processing of correcting the position and posture of the machining tool such that the second-direction force generated until the first-direction force detected by the force sensor 4 reaches a target value becomes a predetermined value or less.

In the present embodiment, the predetermined value of the force $F_{xy\_rep}$ that causes the positional displacement is the maximum static friction force between the tip end of the machining tool 3 and the workpiece W. However, the present embodiment is not limited to this, and any value smaller than the maximum static friction force may be used as the predetermined value.

In the present embodiment, regarding the positioning of the tip end of the machining tool 3, a movement mechanism is controlled in accordance with the predetermined position command values of the joint shafts 7a to 7d. However, for example, the position of the tip end of the machining tool 3 may be made to coincide with the machining reference position of the workpiece while visually confirming the machining reference position of the workpiece with a vision sensor attached to the tip end of the robot. Further, the contact of the tip end of the machining tool 3 with the workpiece W may be detected by the force sensor 4.

The positioning control apparatus 1 of the present embodiment is constituted by an articulated robot. However, the present embodiment is not limited to this as long as the positioning control apparatus 1 is an apparatus configured to perform the machining while pressing the tip end of the machining tool against the predetermined position on the machined surface of the workpiece. For example, the positioning control apparatus 1 may be constituted by a machining center. In this case, the control device 5 is constituted by an NC device, and the machining tool 3 may be attached to, for example, the main shaft head.

In the present embodiment, the workpiece W is placed on the worktable 8 such that the machined surface thereof is parallel to the vertical direction. However, at least a part of the machined surface is only required to be parallel to the vertical direction. For example, a part of the machined surface of the workpiece W may be curved.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is useful in machining which requires highly accurate positioning and generates machining reaction force.

REFERENCE SIGNS LIST 1 positioning control apparatus (robot)
3 machining tool 4 force sensor
5 control device (robot controller)
6 base
7 arm
7a to 7d joint shaft
7e tool attaching portion
8 worktable
9 cable
10 tool main body
11 pressing member
12 machining member (drill)
13 main shaft head
20 calculating portion
21 servo control portion
22 storage portion
23 control command generating portion
24 relational expression deriving portion
25 sideslip amount calculating portion
26 command value correcting portion
27 machining command generating portion
W workpiece
P machining reference position
Q tool tip end position
Q1, Q1n position command value

The invention claimed is:

1. A method of controlling a positioning control apparatus configured to perform machining while pressing a tip end of a machining tool against a predetermined position on a machined surface of a workpiece, the machining tool being attached to an arm tip of the positioning control apparatus, the method comprising steps of:
deriving a predetermined relational expression before the machining, the relational expression defining a relation between (i) a sideslip amount of the tip end of the machining tool in a second direction with respect to a pressing force generated when the tip end of the machining tool is pressed against the predetermined position in a first direction in a state where the tip end of the machining tool coincides with the predetermined position, and (ii) the sideslip amount of the tip end of the machining tool in the second direction with respect to a maximum pressing force that is equal to or greater than a machining reaction force, the second direction being parallel to the machined surface of the workpiece, the first direction being perpendicular to the machined surface of the workpiece;
detecting the pressing force during the machining by a force sensor;
calculating the sideslip amount corresponding to the pressing force detected by the force sensor, in accordance with the predetermined relational expression at any time;
correcting a position command value of the arm tip of the positioning control apparatus based on the calculated sideslip amount; and
machining the workpiece while moving the arm tip of the positioning control apparatus in accordance with the corrected position command value.

2. The method according to claim 1, wherein the step of deriving the predetermined relational expression before the machining includes steps of:
setting a mathematical model by using a plurality of finite elements, the mathematical model being prepared by modeling deflection of the positioning control apparatus;
calculating the sideslip amount with respect to the maximum pressing force by finite element method analysis; and
deriving the predetermined relational expression by substituting the calculated sideslip amount with respect to the maximum pressing force in the mathematical model.

3. The method according to claim 1, wherein the step of deriving the predetermined relational expression before the machining includes the steps of:
controlling the positioning control apparatus such that the tip end of the machining tool is pressed against the machined surface in a state where a position of the tip end of the machining tool coincides with the predetermined position on the machined surface;
detecting a first-direction force and a second-direction force by the force sensor, the first-direction force acting in the first direction perpendicular to the machined surface of the workpiece and being a part of a force received by the tip end of the machining tool from the machined surface of the workpiece, the second-direction force acting in the second direction parallel to the machined surface of the workpiece and being a part of the force received by the tip end of the machining tool from the machined surface of the workpiece;
correcting a position of the machining tool such that the second-direction force generated until the first-direction force detected by the force sensor reaches the maximum pressing force becomes a predetermined value or less; and
deriving the predetermined relational expression by calculating the sideslip amount when the first-direction force detected by the force sensor has reached the maximum pressing force.

4. The method according to claim 1, wherein in the step of machining the workpiece, a pair of plates are friction-stirred and spot-welded to each other with the machining tool by friction stir spot welding.

5. The method according to claim 2, wherein in the step of machining the workpiece, a pair of plates are friction-stirred and spot-welded to each other with the machining tool by friction stir spot welding.

6. The method according to claim 3, wherein in the step of machining the workpiece, a pair of plates are friction-stirred and spot-welded to each other with the machining tool by friction stir spot welding.

7. A method of controlling a positioning control apparatus configured to perform machining while pressing a tip end of a machining tool against a predetermined position on a machined surface of a workpiece, the machining tool being attached to an arm tip of the positioning control apparatus, the method comprising steps of:
deriving a predetermined relational expression before the machining, the relational expression defining a relation of a sideslip amount of the tip end of the machining tool in a second direction with respect to a pressing force generated when the tip end of the machining tool is pressed against the predetermined position in a first direction in a state where the tip end of the machining tool coincides with the predetermined position, the second direction being parallel to the machined surface of the workpiece, the first direction being perpendicular to the machined surface of the workpiece, the deriving of the predetermined relational expression includes:
controlling the positioning control apparatus such that the tip end of the machining tool is pressed against the machined surface in a state where a position of the tip end of the machining tool coincides with the predetermined position on the machined surface, detecting a first-direction force and a second-direction force by a force sensor, the first-direction force acting in the first direction perpendicular to the machined surface of the workpiece and being a part of a force received by the tip end of the machining tool from the machined surface of the workpiece, the second-direction force acting in the second direction parallel to the machined surface of the workpiece and being a part of the force received by the tip end of the machining tool from the machined surface of the workpiece, correcting a position of the machining tool such that the second-direction force generated until the first-direction force detected by the force sensor reaches a maximum pressing force becomes a predetermined value or less, the maximum pressing force being set to a force that is equal to or greater than a machining reaction force, and deriving the predetermined relational expression by calculating the sideslip amount when the first-direction force detected by the force sensor has reached the maximum pressing force;

detecting the pressing force during the machining by the force sensor;

calculating the sideslip amount corresponding to the pressing force detected by the force sensor, in accordance with the predetermined relational expression at any time;

correcting a position command value of the arm tip of the positioning control apparatus based on the calculated sideslip amount; and machining the workpiece while moving the arm tip of the positioning control apparatus in accordance with the corrected position command value, wherein the predetermined value is a value that is equal to or less than a maximum static friction force between the tip end of the machining tool and the workpiece.

8. The method according to claim 7, wherein in the step of machining the workpiece, a pair of plates are friction-stirred and spot-welded to each other with the machining tool by friction stir spot welding.

9. A computer-implemented positioning control apparatus configured to perform machining while pressing a tip end of a machining tool against a predetermined position on a machined surface of a workpiece, the positioning control apparatus comprising:

a relational expression deriving portion configured to derive a predetermined relational expression before the machining, the relational expression defining a relation between (i) a sideslip amount of the tip end of the machining tool in a second direction with respect to a pressing force generated when the tip end of the machining tool is pressed against the predetermined position in a first direction in a state where the tip end of the machining tool coincides with the predetermined position, and (ii) the sideslip amount of the tip end of the machining tool in the second direction with respect to a maximum pressing force that is equal to or greater than a machining reaction force, the second direction being parallel to the machined surface of the workpiece, the first direction being perpendicular to the machined surface of the workpiece;

a force sensor configured to detect the pressing force during the machining;

a sideslip amount calculating portion configured to calculate the sideslip amount corresponding to the pressing force detected by the force sensor, in accordance with the predetermined relational expression at any time;

a position command value correcting portion configured to correct a position command value of the positioning control apparatus based on the calculated sideslip amount; and a control portion configured to control an operation of the positioning control apparatus such that the positioning control apparatus machines the workpiece in accordance with the corrected position command value.

* * * * *